United States Patent
Kinpara (10) Patent No.: US 10,879,761 B2
(45) Date of Patent: Dec. 29, 2020

(54) ROTOR AND METHOD OF MANUFACTURING THE SAME

(71) Applicant: TOYOTA JIDOSHA KABUSHIKI KAISHA, Toyota (JP)

(72) Inventor: Hiroshi Kinpara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 163 days.

(21) Appl. No.: 16/156,449

(22) Filed: Oct. 10, 2018

(65) Prior Publication Data

US 2019/0109511 A1 Apr. 11, 2019

(30) Foreign Application Priority Data

Oct. 11, 2017 (JP) .................................. 2017-197935

(51) Int. Cl.

| | |
|---|---|
| *H02K 1/28* | (2006.01) |
| *H02K 7/00* | (2006.01) |
| *H02K 15/02* | (2006.01) |
| *H02K 1/30* | (2006.01) |
| *H02K 15/03* | (2006.01) |
| *B23K 20/02* | (2006.01) |

(52) U.S. Cl.
CPC .............. *H02K 7/003* (2013.01); *H02K 1/28* (2013.01); *H02K 1/30* (2013.01); *H02K 15/02* (2013.01); *H02K 15/03* (2013.01); *B23K 20/02* (2013.01)

(58) Field of Classification Search
CPC ............. H02K 1/28; H02K 1/30; H02K 15/02
See application file for complete search history.

(56) References Cited

FOREIGN PATENT DOCUMENTS

| CN | 102244425 A | 11/2011 |
|---|---|---|
| JP | 2013-153559 A | 8/2013 |
| JP | 2015-076914 A | 4/2015 |

OTHER PUBLICATIONS

U.S. Appl. No. 16/157,422, filed Oct. 11, 2018.

*Primary Examiner* — Ramon M Barrera
(74) *Attorney, Agent, or Firm* — Sughrue Mion, PLLC (57) ABSTRACT

In a rotor of a rotating electric machine, a rotor core is fixed by plastically deforming a shaft having a simple structure. The rotor core is formed by laminating steel sheets provided with shaft holes. The shaft is formed of a hollow metal component and is inserted so as to penetrate through the shaft holes in the steel sheets. A wall surface of the shaft is partially cut in the circumferential direction, and of two wall surface regions aligned in the axial direction with a cut portion in between, the wall surface region positioned on the side farther from the rotor core is plastically deformed in the radial direction. In this way, protruding portions that open the cut portions are formed. End surfaces of the rotor core are pressure bonded and fixed by the cut portions of these protruding portions.

3 Claims, 11 Drawing Sheets

ROTOR AND METHOD OF MANUFACTURING THE SAME

CROSS REFERENCE TO RELATED APPLICATION

The disclosure of Japanese Patent Application No. 2017-197935 filed on Oct. 11, 2017 including the specification, claims, drawings, and abstract is incorporated herein by reference in its entirety.

TECHNICAL FIELD

The present disclosure relates to a rotor of a rotating electric machine and to a method of manufacturing the same.

BACKGROUND

In manufacturing of a rotating electric machine, a rotor may be formed by laminating electromagnetic steel sheets provided with shaft holes to form a rotor core and inserting a shaft into the shaft holes to fix both the shaft and the rotor core. The shaft and the rotor core need to be connected firmly so that they can endure torque transmission.

Patent Document 1 listed below describes caulk-fixing a shaft and a rotor core by providing a caulking portion at the tip of a tubular body of the shaft and pressing the caulking portion from the tip side in the axial direction to deform it radially outward.

Patent Document 2 listed below describes performing shrink fitting by inserting a room-temperature shaft into a shaft hole of a rotor core with the rotor core heated and thermally expanded.

CITATION LIST

Patent Literature

Patent Document 1: JP 2015-76914 A
Patent Document 2: JP 2013-153559 A

SUMMARY

Technical Problem

In the technique of Patent Document 1 described above, caulk fixing is performed by deforming the tip of the caulking portion. Therefore, the shaft needs to be formed to have a complex structure having a shaft body as a rotational axis and a tubular body positioned around the shaft body.

In the technique of Patent Document 2 described above, when the temperature is raised, peeling and oxidization occurs in insulation films on the surfaces of the electromagnetic steel sheets, and the insulation property deteriorates, which may cause iron loss.

An object of the present disclosure is to provide a rotor in which a rotor core is fixed by plastically deforming a shaft having a simple structure.

Solution to Problem

A rotor according to an aspect of an embodiment includes a rotor core that is formed by laminating steel sheets provided with shaft holes and a shaft that is formed of a hollow metal component and is positioned so as to penetrate through the shaft holes in the steel sheets, and, in this rotor, a wall surface of the shaft is partially cut in the circumferential direction, and of two wall surface regions aligned in the axial direction with a cut portion in between, the wall surface region positioned on the side farther from the rotor core is plastically deformed in the radial direction, thereby forming a protruding portion that opens the cut portion, and at least one axial end surface of the rotor core is pressure bonded and fixed to the cut portion of the protruding portion.

The rotor is a part used in a rotating electric machine. In the rotating electric machine, a stator is positioned around the rotor. The rotor then rotates about the rotational axis, interacting with the stator electromagnetically. The shaft is a component to be an actual rotational axis in the rotor. The shaft is formed of a hollow metal component. "Hollow" indicates a cylindrical shape in which the inside of the wall surface is not filled with metal. When a cylindrical shape (a shape having a cross section which is a perfect circle or can be regarded as a perfect circle) is adopted, the rotational symmetry is improved. However, sufficient rotational stability can be secured so long as the shape has the center of gravity located on the rotational axis, and a variety of shapes, such as an elliptic cylindrical shape (a shape having an elliptic cross section) and a polygonal cylindrical shape (a shape having a polygonal cross section), can be adopted.

The rotor core is formed by laminating steel sheets. Another plate-like component referred to as an end plate may optionally be provided at an end of the laminated rotor core. The steel sheet for each layer is typically formed by blanking one steel sheet into a predetermined shape. However, the rotor core can also be formed by combining a plurality of steel sheets having a predetermined shape. In the case where the plurality of steel sheets are combined, the stability is considered to be increased by fixing one steel sheet using at least one protruding portion. However, when the steel sheets are combined with each other with sufficient strength, there is no need to provide protruding portions for all the steel sheets. The steel sheet for each layer is provided with a shaft hole, and thus, a shaft hole penetrating through the layers is formed in the laminated rotor core. The shaft is inserted into this shaft hole. Although the shaft hole is generally formed in the same shape as an outer shape of the shaft, it may be formed in a shape different from the outer shape of the shaft, for example, by providing a groove in the rotational axis direction. The size of the shaft hole can be set in various manners. For example, when the shaft hole is formed to be larger than the shaft, the shaft can be inserted smoothly without resistance. For example, when the shaft hole is formed to have almost the same size as the shaft, the shaft is inserted by press fitting, for example.

The protruding portion is provided in order to fix at least one end surface of the rotor core. The protruding portion is formed by partially cutting the wall surface of the shaft in the circumferential direction and by plastically deforming, of two wall surface regions aligned in the axial direction with the cut portion in between, the wall surface region located on the side farther from the rotor core, in the radial direction (toward outside the shaft). Although the wall surface region on the side nearer from the rotor core need not be deformed or destroyed, it may be deformed or destroyed so long as it does not become an obstacle for fixing by the protruding portion. Cutting of the wall surface can be performed linearly in the circumferential direction. That is, cutting may be performed only in the circumferential direction at a position fixed in the axial direction. However, cutting may be performed to form a shape which also changes in the axial direction. Of cut portions, the cut portion located on the protruding portion side is deformed in accordance with the protrusion, an opening is formed between the cut portion and a cut portion to be paired. Then, the cut portion on the protruding portion side forms an opening end of the protruding portion. The end surface of the rotor core is pressure bonded and fixed by this cut portion. The expression "being pressure bonded and fixed" means that the two are not merely in contact but fixed with the pressure applied between them. A part or the whole of the cut portion may be a portion for pressure bonding.

When a shape of the cut portion and a shape of a pressure bonding part on the end surface are identical or similar to each other, pressure bonding can be performed over that entire portion. The pressure applied to the pressure bonding part is dispersed more as the area of the pressure bonding part becomes wider. Although the number of protruding portions for fixing one end surface may be one, it may also be two or more, three or more, or five or more. When the number of protruding portions increases, the stability in fixing the rotor core increases. However, when the number of protruding portions increases, manufacturing processes also increase. Accordingly, the number of protruding portions for fixing one end surface may be five or less or three or less, for example. Such fixing by means of the protruding portions can be considered to be caulking, because the rotor core is pressure bonded and fixed by plastically deforming the stator.

According to an aspect of the disclosure, in the rotor, the cut portion of the protruding portion is formed approximately parallel to the pressure bonding part on the end surface.

The end surface, and thus the pressure bonding part on the end surface, are typically formed in shapes that are approximately orthogonal to the rotational axis. In this case, by also making the cut portion approximately orthogonal to the rotational axis, it becomes possible to make the end surface and the cut portion parallel to each other and in surface contact with each other. A method for making the cut portion approximately orthogonal to the rotational axis includes allowing a shape of the cut in the wall surface to change not only in the circumferential direction but also in the axial direction. Specifically, by allowing the cut, center portion to have a convex shape when viewed from the protruding portion side, it may be possible to make the cut portion of the protruding portion approximately orthogonal to the rotational axis. Examples of such a shape can include shapes combining smooth curves, such as an arc and a parabola, or straight lines, such as a V shape.

When the pressure bonding part on the end surface is not orthogonal to the rotational axis, by forming the cut portion to be approximately parallel to this pressure bonding part, it becomes possible to make them in surface contact with each other. The pressure bonding part is not orthogonal to the rotational axis, for example, when end plates are provided on the end sides of the steel sheets, and those end plates have uneven surfaces, or when no end plate is provided, and a laminate body is formed in three dimensions by blanking one or more steel sheets located at the contact position. The direction and the size of the cut portion is adjustable by a machining method, for example. They may also be controlled by a shape of a tool used in machining or by a position, direction, speed, strength, etc. at which the tool is operated.

"Approximately parallel" means that two are in a range where they are parallel or in a range nearly parallel, and consequently, surface contact between them is possible. Although that specific angle depends on the condition, it is assumed, for example, that the angle between the two is 3 degrees or less, 5 degrees or less, 10 degrees or less, 20 degrees or less, or so.

According to an aspect of the disclosure, in the rotor, both end surfaces of the rotor core are fixed by the cut portions of the protruding portions respectively formed near the end surfaces. When both end surfaces are fixed by the protruding portions, the number, shape, position, etc. of the protruding portions provided for each end surface may be the same or differ According to an aspect of the disclosure, a rotor manufacturing method is a method of manufacturing a rotor including a rotor core that is formed by laminating steel sheets provided with shaft holes, and a shaft that is formed of a hollow metal member and is positioned so as to penetrate through the shaft holes in the steel sheets, the method including partially cutting a wall surface of the shaft in the circumferential direction, and plastically deforming, of two wall surface regions aligned in the axial direction with a cut portion in between, the wall surface region positioned on the side farther from the rotor core in a shape protruding in the radial direction, thereby forming, on the wall surface of the shaft, a protruding portion that opens the cut portion, and pressure bonding and fixing one axial end surface of the rotor core to the cut portion of the protruding portion.

According to an aspect of the disclosure, the rotor manufacturing method further includes pressing the one end surface to the other end surface side with a position of the other end surface of the rotor core fixed in the axial direction, wherein in the forming, the protruding portion is formed near the one end surface with the one end surface pressed, and in the fixing, by releasing pressing after the forming, the one end surface is fixed by the cut portion of the corresponding protruding portion.

According to an aspect, the rotor manufacturing method includes partially cutting the wall surface of the shaft in the circumferential direction near a position where the other end surface is fixed, and plastically deforming, of two wall surface regions aligned in the axial direction with a cut portion in between, the wall surface region positioned on the side farther from the rotor core in a shape protruding in the radial direction, thereby forming, on the wall surface of the shaft, a second protruding portion that opens the cut portion, and in this method, in the pressing, the position of the other end surface is fixed in the axial direction near the cut portion of the second protruding portion, and after pressing is released in the fixing, the one end surface is pressure bonded and fixed by the protruding portion, and the other end surface is pressure bonded and fixed by the second protruding portion.

In the pressing, the other end surface can be fixed in the axial direction by the cut portion of the second protruding portion. This is advantageous in that the other end surface is positioned by the cut portion itself which is the final fixed position. However, the second protruding portion needs to be made strong enough to endure pressing. The other end surface may also be fixed in the axial direction near the cut portion of the second protruding portion, for example, by an auxiliary component prepared for manufacturing. In this case, while the second protruding portion is not pressed, the other end surface is positioned at a position slightly shifted from the cut portion of the second protruding portion. It is also possible to fix the other end surface by using both of the cut portion of the second protruding portion and the auxiliary component to disperse the pressing load.

According to an aspect, in the rotor manufacturing method, a tool insertion hole is provided in the wall surface of the shaft, and in the forming, machining is performed such that a tool is inserted inside the shaft through the tool insertion hole from the outside of the shaft and stabbed into an inner wall surface in the vicinity facing the tool insertion hole, thereby forming the protruding portion.

The protruding portion can be formed simply by stabbing this tool. However, for example, it is also possible to perform machining in advance to form, from the outer wall surface side, a part or the whole of the cut portion corresponding to the protruding portion to be formed. In this case, it is possible to make the force required for the subsequent process relatively small. Therefore, there is room for forming the projecting portion from the inside of the hollow or from the outside wall surface side, without providing a tool insertion hole. In addition, machining may be carried out easily from the outer wall surface side by performing, for example, a drilling process on, of the two wall surface regions aligned in the axial direction with the cut portion in between, the portion positioned on the side closer to the rotor core.

Advantageous Effect of the Invention

In the case where the rotor is fixed by the shaft, it becomes possible to fix the rotor core by plastically deforming the hollow shaft.

BRIEF DESCRIPTION OF DRAWINGS

An embodiment of the present disclosure will be described by reference to the following figures, wherein.

DESCRIPTION OF EMBODIMENTS

Hereinafter, an embodiment will be described with reference to the drawings. Although, in the description, specific aspects will be described for easy understanding, these are examples of the embodiment, and a variety of other embodiments are possible.

Figure 1A:
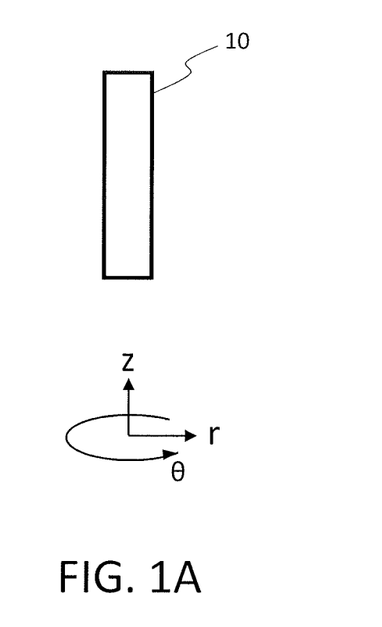
FIG. 1A is a view showing a flow of fixing a shaft and a rotor core according to an embodiment.

FIG. 1A to FIG. E are side views schematically illustrating a flow of manufacturing a rotor according the embodiment. FIG. 1A shows a shaft 10. The shaft 10 is a metal component that becomes a rotational axis of the rotor. The shaft 10 is formed in a cylindrical shape elongated in the rotational axis direction. That is, the shaft 10 is formed of the relatively thin cylindrical wall surface and has a hollow inside. This shaft 10 can be formed, for example, by extruding a versatile metallic pipe component (electric welded pipe, UO pipe, etc.) and machining it into a predetermined size.

In the lower part of FIG. 1A, the cylindrical coordinate system of (z, r, θ) is shown in an arrangement like a perspective view for convenience of explanation. The z coordinate indicates the axial direction of the cylindrical coordinates and corresponds to the rotational axis direction of the shaft 10. Hereinafter, the rotational axis direction may also be simply referred to as the "axial direction." The r coordinate is a coordinate extending perpendicularly from the rotational axis, and the direction away from the rotational axis is referred to as the "radial direction." The 0 coordinate indicates the direction about the rotational axis and may also be referred to as the "circumferential direction" or the "rotational direction." When the rotor is manufactured, there is no need to strictly follow the directions of the coordinate axes, and a slight deviation is allowable.

Figure 1B:
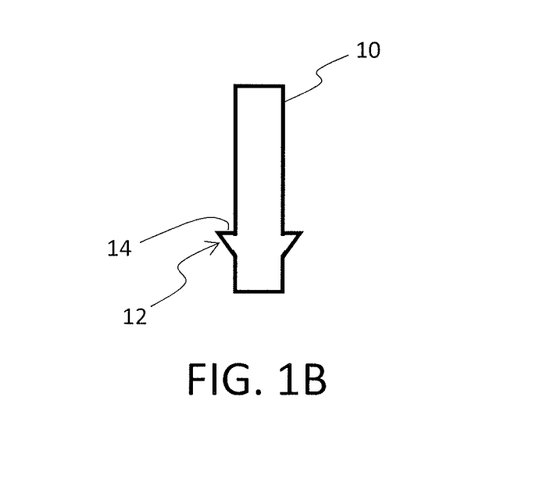
FIG. 1B is a view showing a flow of fixing the shaft and the rotor core according to the embodiment.

In FIG. 1B, a lower protruding portion 12 having a radially (direction outward from the wall surface) protruding shape is formed on the wall surface of the shaft 10. There are provided a plurality of lower protruding portions 12 along the circumferential direction at positions on the negative side in the axial direction side (the lower side in the figure). As described below in detail, the lower protruding portions 12 are formed by cutting a part of the wall surface in the circumferential direction. A cut section 14 on the axially plus side (the upper side in the figure) of the lower protruding portion 12 is a portion formed of a protrusion of the cut portion of the wall surface and is formed in a shape approximately parallel to the radial direction.

Figure 1C:
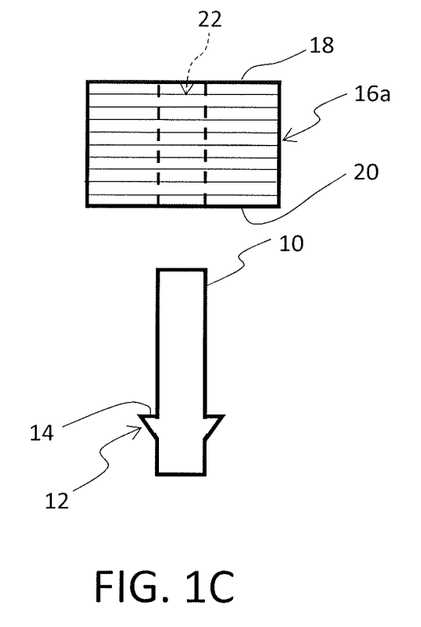
FIG. 1C is a view showing a flow of fixing the shaft and the rotor core according to the embodiment.

FIG. 1C shows a process immediately before the shaft 10 is inserted into a rotor core 16a. The rotor core 16a is a component formed by laminating a number of electromagnetic steel sheets. An upper end surface 18 located on the positive side in the axial direction and a lower end surface 20 located on the negative side in the axial direction are formed to be approximately parallel to the radial direction (approximately perpendicular to the axial direction). The center portion of each electromagnetic steel sheet is provided with a hole in which the shaft 10 is to be inserted, and a shaft hole 22 is thus formed in the center of the rotor core 16a in which these electromagnetic steel sheets are laminated. The shaft hole 22 may have a size that allows the shaft 10 to be inserted smoothly or may have a size for which the shaft 10 has to be press fitted. In the former case, the shaft 10 and the rotor core 16a are not fixed only by inserting the shaft 10. In the latter case, after the shaft 10 is press fitted, the positional relation between the shaft 10 and the rotor core 16a is fixed to some extent. However, generally, the fixing strength required for the shaft 10 and the rotor core 16a cannot be obtained only by press fitting.

Figure 1D:
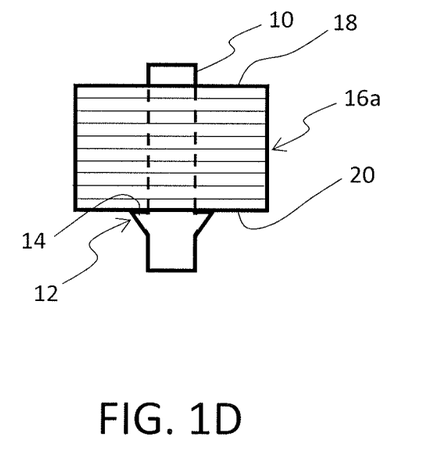
FIG. 1D is a view showing a flow of fixing the shaft and the rotor core according to the embodiment.

FIG. 1D shows the shaft 10 inserted into the shaft hole 22 of the rotor core 16a. The shaft 10 is inserted into the shaft hole 22 of the rotor core 16a from the positive side in the axial direction. The shaft 10 is then inserted to the position where the lower end surface 20 of the rotor core 16a is in surface contact with the cut section 14 of the lower protruding portion 12.

Figure 1E:
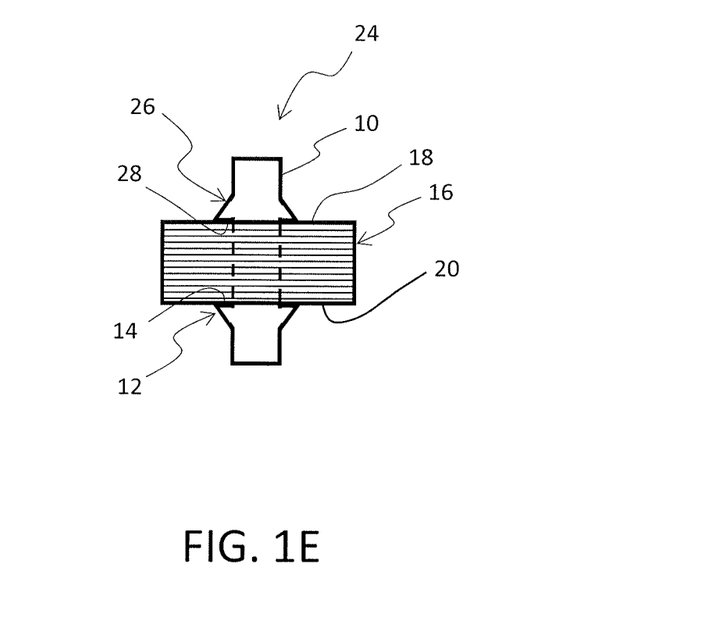
FIG. 1E is a view showing a flow of fixing the shaft and the rotor core according to the embodiment.

FIG. 1E is a view showing the rotor core 16 being fixed by the shaft 10. The rotor core 16 is compressed by the pressing force received from the axially plus side. On the wall surface of the shaft 10, a plurality of upper protruding portions 26 are also formed on the positive side of the axial direction. Like the lower protruding portions 12, these upper protruding portions 26 are formed by cutting a part of the wall surface. The cut sections 28 of the upper protruding portions 26 are located on the negative side of axial direction of the upper protruding portions 26 and are formed to be approximately parallel to the radial direction. The upper end surface 18 of the rotor core 16 is pressure bonded as a surface by these cut sections 28. Thus, the rotor core 16 is fixed so as to be an elastically deformed in the axial direction; that is, so as to have axial tension, thereby forming a rotor 24. The process of pressing the rotor core 16 and the process of forming the upper protruding portions 26 will next be described in detail.

The rotor core 16 has magnet insertion holes (not shown) that are arranged regularly, and permanent magnets are inserted into them at an appropriate point of time (it may be before or after the rotor core 16 is combined with the shaft 10). Thus, in the rotor core 16, magnetic poles are foil red so as to be arranged periodically in the circumferential direction. When these magnetic poles are subjected to magnetic force from magnetic poles of a stator arranged around the rotor core 16, the rotor 24 rotates about the rotational axis. At this time, the rotor core 16 is subjected to, for example, centrifugal force associated with high-speed rotation and force associated with torque transmission with the shaft 10. However, because the rotor core 16 is fixed to the shaft 10 with sufficient axial tension, idling of the rotor core 16 and the shaft 10 is inhibited.

Figure 2A:
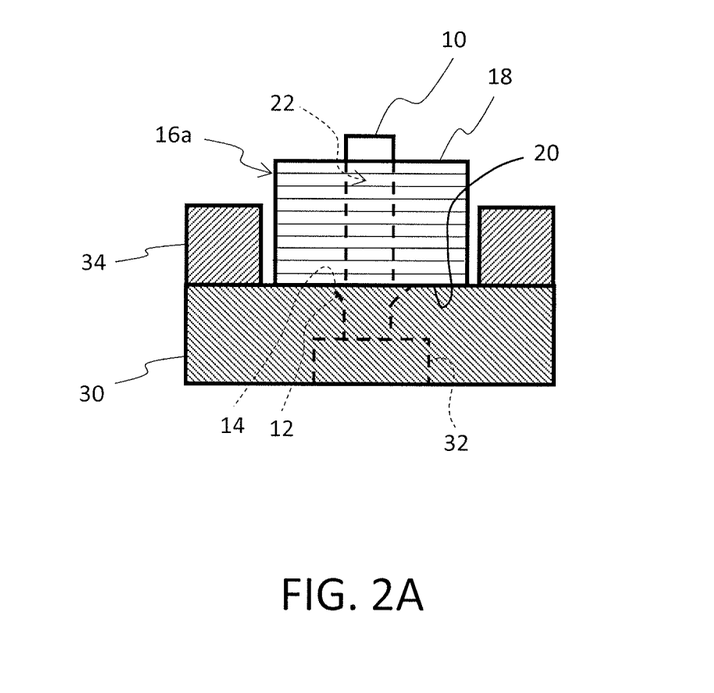
FIG. 2A is a view showing pressing of the rotor core.
Figure 2B:
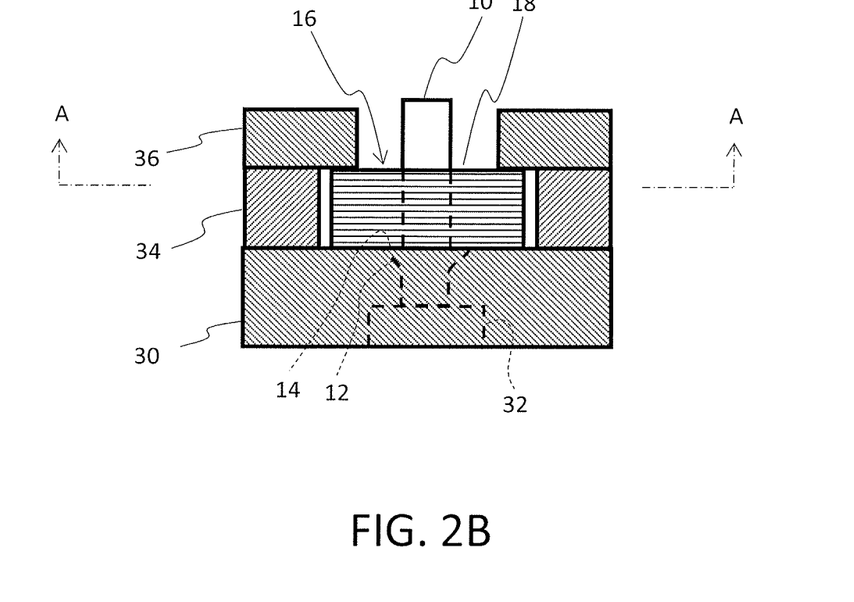
FIG. 2B is a view showing pressing of the rotor core.

Pressing will now be described with reference to FIGS. 2A and 2B. FIGS. 2A and 2B are views showing a process of forming the axially compressed rotor core 16 by pressing the rotor core 16a. FIG. 2A is a view corresponding to the state of FIG. 1D and shows the shaft 10 inserted through the shaft hole 22 of the rotor core 16a. The lower end surface 20 of the rotor core 16a is located on a lower mold block 30. In addition, the shaft 10 is located on a shaft base 32. The heights of the lower mold block 30 and the shaft base 32 are adjusted such that the lower end surface 20 of the rotor core 16a substantially contacts the cut sections 14 of the lower protruding portions 12 of the shaft 10. An end block 34 is located on the lower mold block 30. The end block 34 is positioned so as to surround the rotor core 16a. The height of end block 34 is adjusted to the height to which the rotor core 16a is desired to be pressed and compressed.

FIG. 2B shows the rotor core 16 being pressed. An upper mold block 36 is located on the upper side of the end block 34. The rotor core 16 is pressed by the upper mold block from the positive side in the axial direction to the negative e side and is compressed to the height of the end block 34. However, in the figure, the degree of such compression is exaggerated for explanation. As described below in detail, the upper protruding portions 26 are formed on the shaft 10 while the rotor core 16 is pressed in this manner. Subsequently, the upper mold block 36, the end block 34, the lower mold block 30, and the shaft base 32 are removed. Thus, the rotor core 16 is pressure bonded and fixed by the lower protruding portions 12 and the upper protruding portions 26 as shown in FIG. 1E.

The rotor core 16 needs to be provided with necessary axial force, and positions at which the upper protruding portions 26 are formed are determined in consideration of that axial force. Then, the height of the end block 34 is set to a position at which the rotor core 16 does not become an obstacle (a range that does not cause interference or a range that does not have an effect even if causes interference) in the process of forming the upper protruding portions 26. For example, when, in the process of forming the upper protruding portions 26, the wall surface at a position below the final position of the cut section 28 begins to protrude, the upper end surface 18 of the rotor core 16 is pressed down so as not to become an obstacle for this movement of the wall surface. However, from a viewpoint of carrying out efficient pressing, it is preferable to set the height of the end block 34 to the highest position at which the rotor core 16 does not become an obstacle. In this way, the upper protruding portions 26 are formed at predetermined positions with the rotor core 16 compressed slightly more strongly than in the final state. Then, by releasing pressing subsequently, the rotor core 16 expands slightly and is pressure bonded and fixed to the cut sections 28 of the upper protruding portions 26.

In the case where the lower end surface 20 of the rotor core 16 contacts the lower mold block 30 only and does not contact the cut sections 14 of the lower protruding portions 12, at the stage of removing the lower mold block 30 and the shaft base 32, the rotor core 16 expands slightly and is pressure bonded and fixed to the cut sections 14 of the lower protruding portions 12. If the lower protruding portions 12 have sufficient strength, pressure bonding and fixing can be carried out such that the lower end surface 20 of the rotor core 16 contacts only the cut sections 14 of the lower protruding portions 12, but is not allowed to contact the lower mold block 30. However, from a viewpoint of machining the shaft 10 and the rotor core 16 after stabilizing them, use of the lower mold block 30 is considered to be reasonable.

Next, formation of the upper protruding portions 26 and the lower protruding portions 12 (hereinafter, these may also be simply and collectively referred to as "protruding portions") will be described with reference to FIGS. 3 to 5.

Figure 3A:
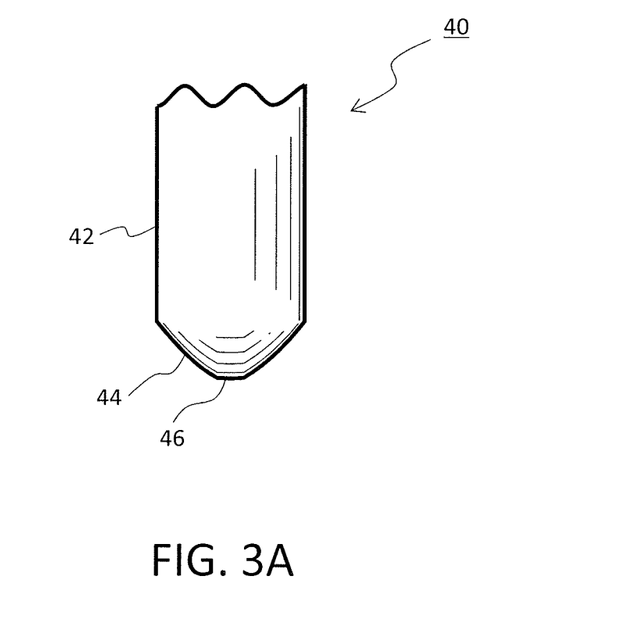
FIG. 3A is a view showing a shape of a tool.
Figure 3B:
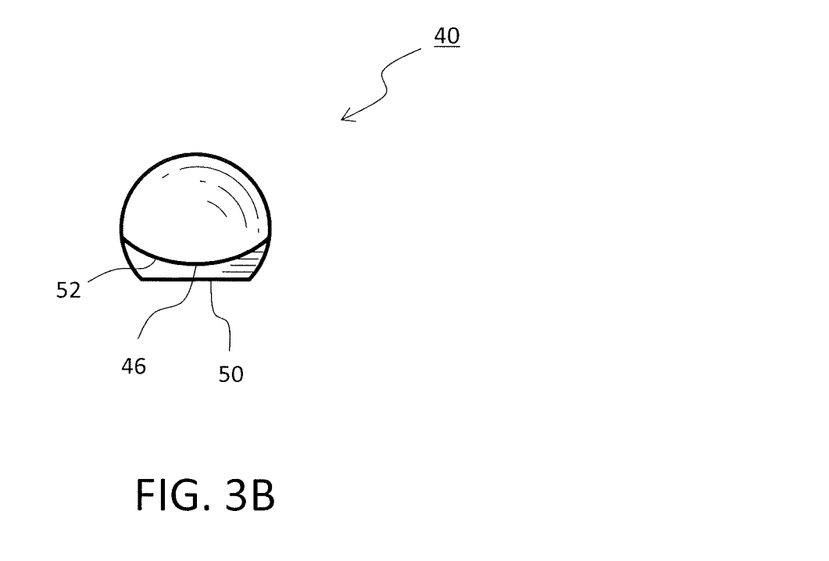
FIG. 3B is a view showing a shape of the tool.
Figure 3C:
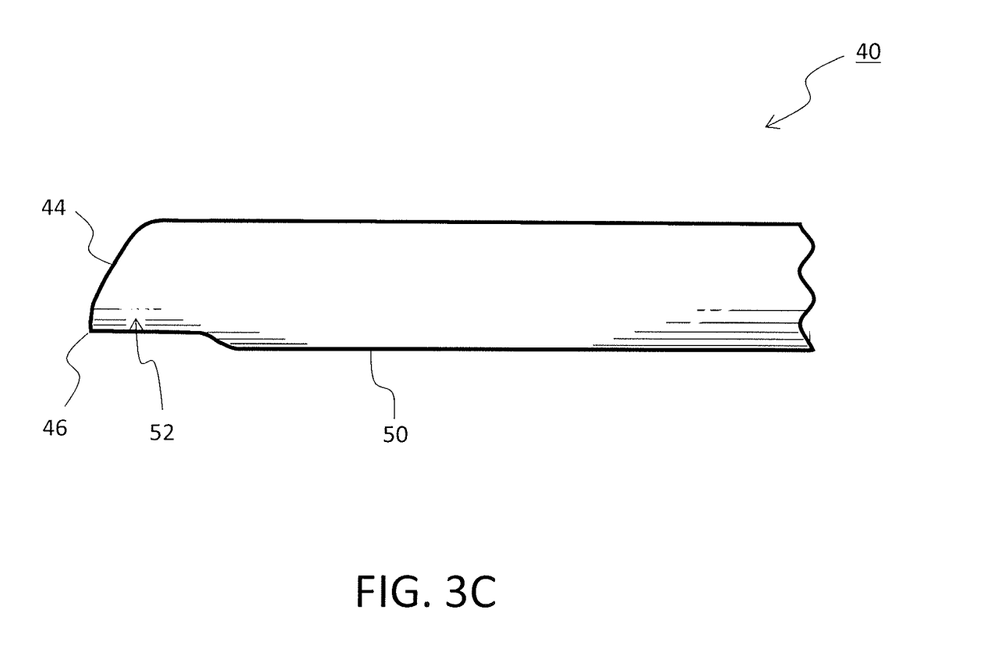
FIG. 3C is a view showing a shape of the tool.

FIGS. 3A to 3C are views illustrating a shape of a tool 40 for forming the protruding portion. FIG. 3A is a top view; FIG. 3B is a front view; and FIG. 3C is a side view. In these figures, the up-and-down direction of the tool 40 is set on the assumption that the upper protruding portions 26 are formed.

The tool 40 is made of an alloy, such as high-speed steel or a hard metal alloy, that is sufficiently harder and more durable than the shaft 10. As shown in FIGS. 3A and 3C, the tool 40 is made such that an elongated rod portion 42 has, on its top, a tapered portion 44 in which the width and the height are reduced sharply toward a tip 46. As shown in FIG. 3B, in the tool 40, the upper surface and the side surface of the rod portion 42 have a columnar shape having an arc-shaped cross section. In addition, a lower surface 50 of the rod portion 42 has a planar shape. However, a lower surface 52 near the tapered portion 44 has a columnar shape having a gentle arch-shaped cross section that is convex downward. Although the upper surface and the side surface converge in an obtuse shape in the tapered portion 44, the lower surface 52 is made in a shape orthogonal to a surface of the tip 46.

Figure 4A:
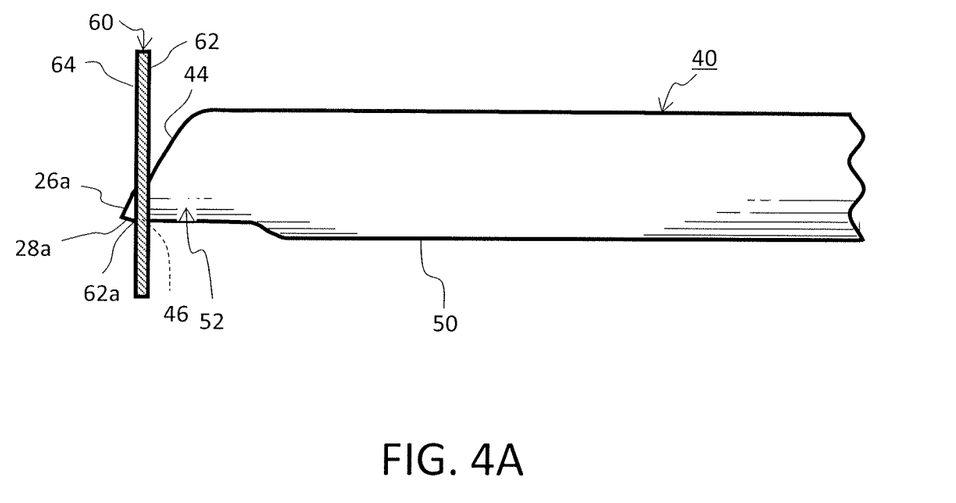
FIG. 4A is a side cross section showing a protruding portion being formed with the tool.
Figure 4B:
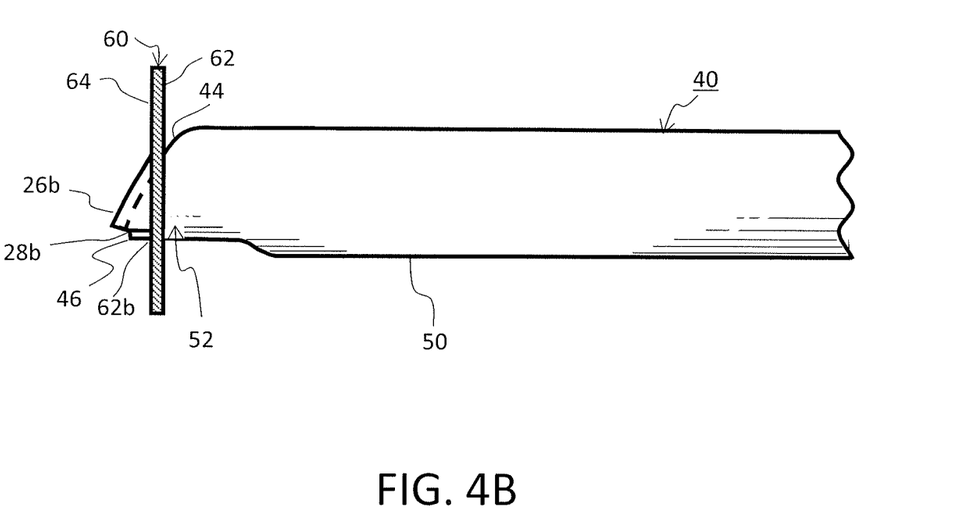
FIG. 4B is a side cross section showing the protruding portion being formed with the tool.
Figure 4C:
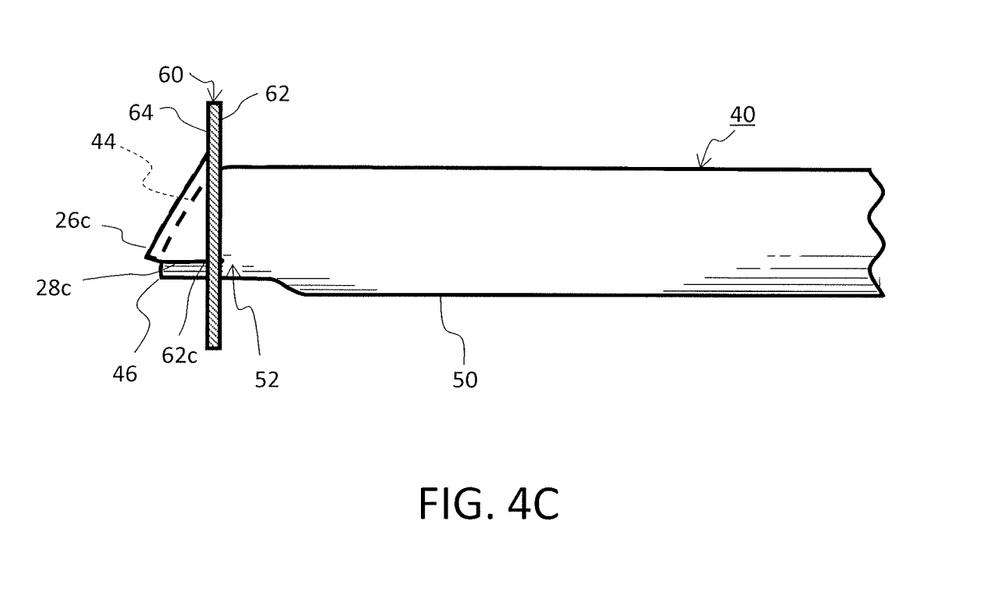
FIG. 4C is a side cross section showing the protruding portion being formed with the tool.

FIGS. 4A to 4C are side cross sections chronologically showing the process of forming the upper protruding portion 26 on the wall surface 60 of the shaft 10 using the tool 40. FIG. 4A shows a state immediately after the tool 40 set to be approximately perpendicular to the wall surface 60 is stabbed into an inner wall surface 62 of the wall surface 60 from the direction approximately perpendicular to the wall surface 60. The tip 46 of the tool 40 sinks into the inner wall surface 62 by a short distance. At this time, because the lower surface 52 of the tip 46 does not have a component of the tool 40 on its lower side, it allows strong shear stress to act on the wall surface 60. As a result, on the wall surface 60, a part near a position 62a corresponding to the lower surface 52 of the tip 46 is cut, and a cut section 28a is started to be formed. At the same time, on the upper side of this cut portion, the upper protruding portion 26a is started to be formed on the outer wall surface 64 side by pushing out the wall surface outwardly by the tip 46 and the tapered portion 44.

In FIG. 4B, the tool 40 is pushed into the wall surface 60 further, and the tip 46 of the tool 40 has already penetrated through the wall surface 60. At this stage, the lower surface 52 gently arched in the tapered portion 44 applies, at a portion where it contacts the wall surface 60, new shear stresses one after another to the wall surface 60. Then, the wall surface 60 is cut according to the shape of the lower surface 52 as a cut position 62b is raised. Meanwhile, the portion that was already cut is pushed by the tapered portion 44 and increases the amount of protrusion while it is plastically deformed. The upper protruding portion 26 and a cut section 28b thus continue to grow.

FIG. 4C shows a state where the tool 40 reaches nearly the final position. Here, a protruding portion 26c having a shape corresponding to the tapered portion 44 is formed. A cut position 62c further rises according to the arch of the lower surface 52 of the tapered portion 44. In addition, because the previously cut portion is subjected to tensile stress from the surrounding wall surface 60 as it goes farther from the wall surface 60, the previously cut portion continues to protrude upward from the cut position. As a result, a cut section 28c is formed in a shape approximately perpendicular to the wall surface 60. Thus, it becomes possible to pressure bond the upper end surface 18 of the rotor core 16 having a shape substantially perpendicular to the wall surface 60 over substantially the entire cut section 28c.

As a technique of forming a protruding portion with an opening by half blanking a sheet metal, a louver punch used in, for example, an air vent is known. However, because the present embodiment is directed to a shaft of a rotor, it completely differs from the louver punch in terms of intended purpose and has requirements that greatly differ from the louver punch in terms of accuracy and strength.

Figure 5A:
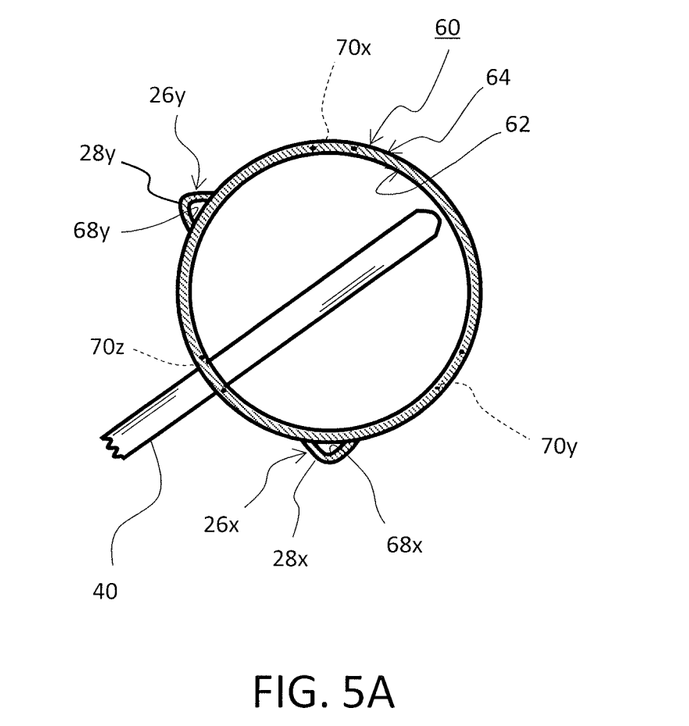
FIG. 5A is a horizontal cross section showing the protruding portion being formed with the tool.
Figure 5B:
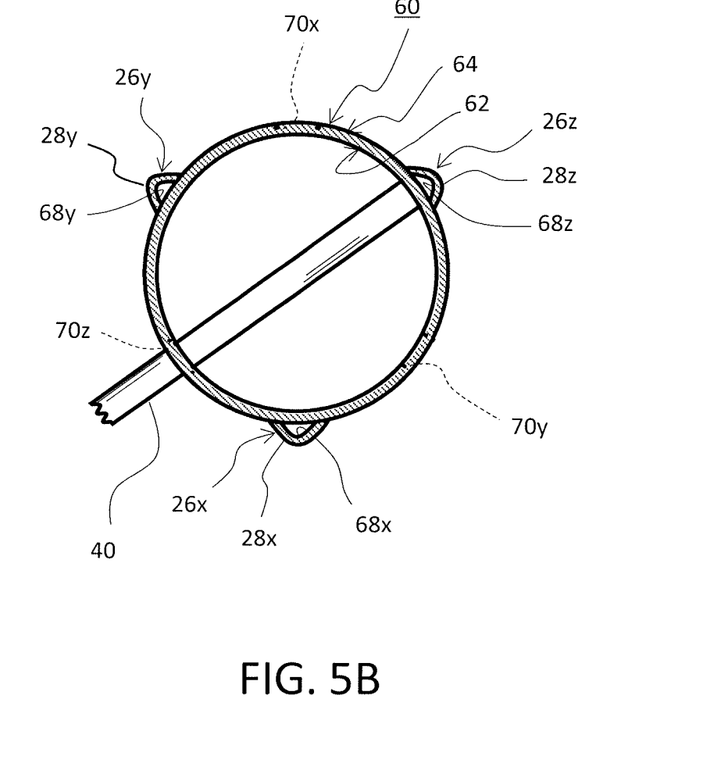
FIG. 5B is a horizontal cross section showing the protruding portion being formed with the tool.

FIGS. 5A and 5B are cross sections of the shaft 10 taken along section AA in FIG. 29 and show the process of forming the upper protruding portions 26 using the tool 40. However, the rotor core 16 is omitted from the figures.

At the stage of FIG. 5A, upper protruding portions 26x and 26y are already formed on the outer wall surface 64 of the wall surface 60. The upper protruding portion 26x has a protruding cut section 28x and an opening 68x, and the upper protruding portion 26y has a cut section 28y and an opening 68y. The upper protruding portions 26x and 26y are formed at positions separated from each other by approximately 120 degrees when viewed in the circumferential direction, and a new upper protruding portion 26z is about to be formed at a position which forms an approximate equilateral triangle with these protruding portions.

Upper tool insertion holes 70x, 70y, and 70z are provided at positions opposite the upper protruding portions 26x, 26y, and 26z, respectively (positions separated by 180 degrees when viewed in the circumferential direction) so as to penetrate through the wall surface 60 from the inner wall surface 62 to the outer wall surface 64. At the stage of FIG. 5A, the tool 40 is inserted into the upper tool insertion hole 70z from the outer wall surface 64 side and is about to be stabbed into an opposite position on the inner wall surface 62. At the stage of FIG. 5B, the upper protruding portion 26z is formed at the position where the tool 40 is stabbed. The upper protruding portion 26z includes a protruding cut section 28z and an opening 68z formed behind it. The tip portion of the tool 40 can be seen in the opening 68z.

Although the process of forming the upper protruding portions 26 using the tool 40 has been explained, it is also possible to form the lower protruding portions 12 in a manner similar to that explained above.

Figure 6:
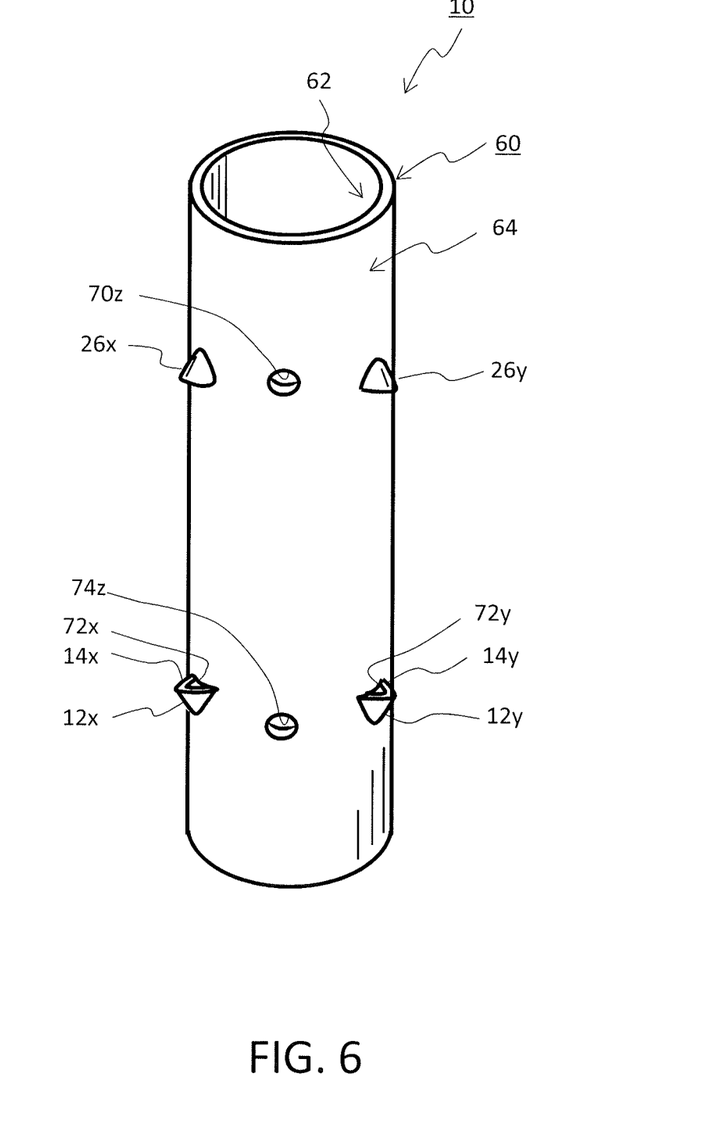
FIG. 6 is a perspective view of the shaft.

Next, the shaft 10, on which the upper protruding portions 26 and the lower protruding portions 12 are formed, will be described with reference to FIGS. 6 to 8. FIG. 6 is a perspective view of the shaft 10, and FIGS. 7 and 8 are partial front views of the shaft 10.

As shown in FIG. 6, the shaft 10 is formed of the wall surface 60 having a cylindrical shape. On its outer wall surface 64, the upper protruding portions 26x and 26 are formed on the axially plus side (the upper side in the figure). The upper protruding portion 26z is hidden by the wall surface 60 and is thus not shown. The upper tool insertion hole 70z is provided between the upper protruding portions 26x and 26y. In addition, the lower protruding portions 12x and 12y are formed on the negative side in the axial directly (the lower side in the figure) of the outer wall surface 64. Cut sections 14x and 14y that are formed of protrusions of the cut portions are formed on the lower protruding portions 12x and 12y, respectively. Openings 72x and 72y are also formed inside the cut sections 14x and 14y, respectively. Furthermore, a lower tool insertion hole 74z is provided between the lower protruding portions 12x and 12y. Although, in FIG. 1E, the upper protruding portions 26 and the lower protruding portions 12 are shown in a simplified manner, actually, the rotor core 16 is pressure bonded and fixed by the plurality of upper protruding portions 26x, 26y, and 26z and the plurality of lower protruding portions 12x, 12y, and 12z in this manner.

Figure 7:
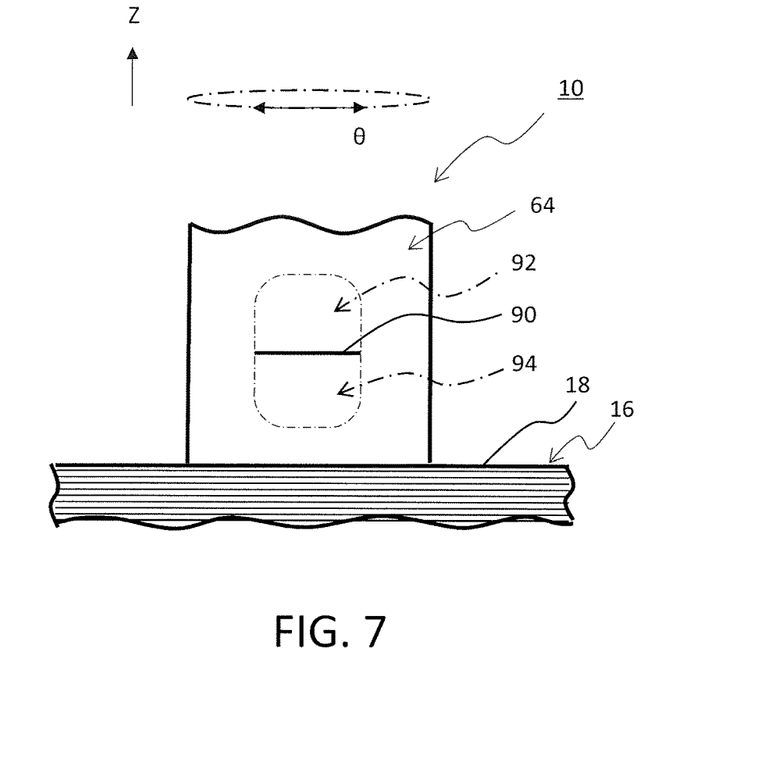
FIG. 7 is a partial front view of the shaft.

FIG. 7 is a view showing a positional relation of the cut portions on the shaft 10. In FIG. 7, it is assumed that the upper protruding portions are provided on the upper end surface 18 of the rotor core 16. FIG. 7 shows a cut portion 90 that partially cuts the wall surface including the outer surface 64 of the shaft 10 along the θ direction (circumferential direction). There are two wall surface regions 92 and 94 aligned in the z direction (axial direction) with the cut portion 90 in between. The wall surface region 92 positioned on the side farther from the rotor core 16 is plastically deformed in the radial direction by plastic deformation. By plastically deforming this wall surface region 92, the upper protruding portion that opens the cut portion 90 is formed, and the upper end surface 18 of the rotor core 16 is pressure bonded and fixed by the cut portion 90. However, the illustrated area of the wall surface region 92 is conceptual, and does not always match the area that is actually plastically deformed. In addition, the positions of the upper end surface 18 of the rotor core 16 and the cut portion 90 in FIG. 7 are mere examples, and, as described below, various aspects will be adopted from a point of view of manufacturing.

Figure 8:
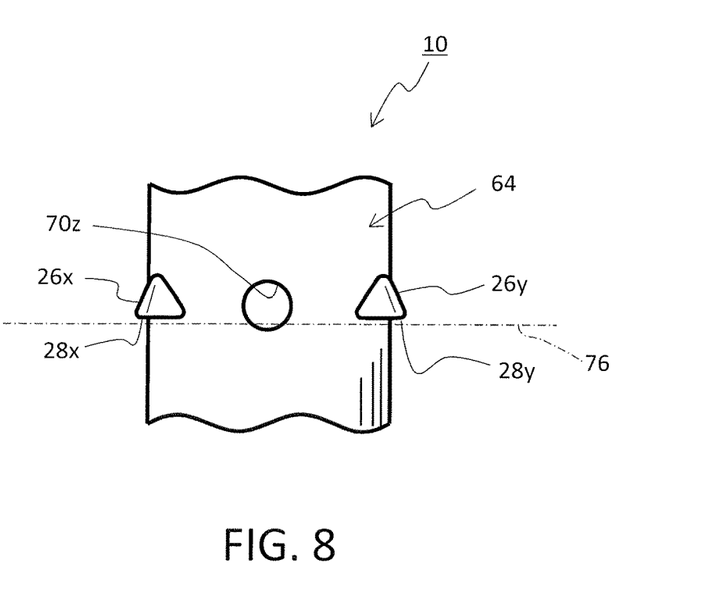
FIG. 8 is a partial front view of the shaft.

FIG. 8 is a front view showing the vicinity of the upper protruding portions 26x and 26y and the upper tool insertion hole 70z of the shaft 10 shown in FIG. 6. An additional line 76 indicates the position of the upper end surface 18 of the rotor core 16 during the pressing process shown in FIG. 2B. In the pressing process, the upper end surface 18 of the rotor core 16 is compressed to a position slightly below the positions where the cut sections 28x and 28y of the upper protruding portions 26x and 26y are formed. This is because, as shown in FIGS. 4A to 4C, the cut sections 28x and 28y are formed moving slightly upward as the upper protruding portions 26x and 26y protrudes. The upper tool insertion hole 70z then needs to be provided at a position which allows the tool 40 to be inserted without interference from the upper end surface 18 of the rotor core 16. Because the lower surface 50 of the tool 40 is formed flat as shown in FIG. 3B, interference between the two of them can be prevented by positioning this flat portion above the upper end surface 18 of the rotor core 16. In order to reduce a possibility that the tool 40 interferes with the rotor core 16, it is also effective to set the lower surface 50 of the rod portion 42 of the tool 40 to the same height as the lower surface 52 of the tapered portion 44.

When the upper tool insertion hole 70z is set to the same height as the positions of the upper protruding portions 26x and 26y (these are at the same position as the upper protruding portion 26z when viewed in the axial direction), as shown in FIGS. 4A to 4C, it becomes possible to stab the tool 40 which is set to be perpendicular to the wall surface 60, into the wall surface 60 perpendicularly. In this case, generally, improvement of the machining accuracy is facilitated. However, it is also possible to provide the upper tool insertion hole 70z at a position slightly above the upper protruding portions 26x and 26y. In this case, although the tool 40 is inserted diagonally from slightly above, there is room for allowing necessary machining to be carried out. In addition, even when the tool 40 is inserted diagonally from above, the machining method may be modified to stab the tool 40 into the wall surface 60 perpendicularly. As a specific example, there is an aspect of forming the tip side of the tool 40 in a curved shape and manipulating a machining robot to insert the tip side diagonally and then stab it perpendicularly.

In addition, the position of the upper tool insertion hole 70z may be set to the same height as the upper protruding portions 26x and 26y or to a height relatively close to them by forming a recess in the upper end surface 18 of the rotor core 16. For example, by providing a hole in one or more of the electromagnetic steel sheets from the upper end surface 18 side, it becomes possible to form a recess in the upper end surface 18. As another example, when the upper end surface 18 is composed of an end plate, it is possible to machine the end plate to have a shape recessed near the upper tool insertion hole 70z.

Figure 9:
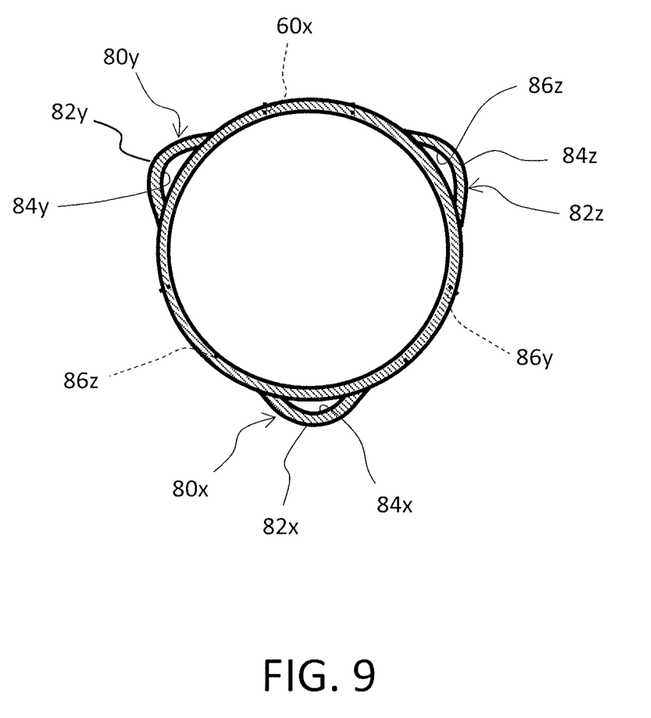
FIG. 9 is a view showing a variant of the protruding portion.

Another example of the protruding portion will now be described with reference to FIG. 9. FIG. 9 is a cross section of the shaft 10 taken along the same plane as in FIGS. 5A and 5B. In this example, the shaft 10 is provided with upper protruding portions 80x, 80y, and 80z having larger angles in the circumferential direction as compared to the example in FIG. 5B. Specifically, compared to the upper protruding portion 26x in FIG. 5B having an angle of approximately 10 degrees to 15 degrees or so in the circumferential direction, the upper protruding portion 80x in FIG. 9 has an angle of 30 to 40 degrees or so. As a result, in the example in FIG. 9, the area of protruding cut sections 82x, 82y, and 82z and the area of openings 84x, 84y, and 84z of the upper protruding portions 80x, 80y, and 80z are also increased. However, regarding the degree of protrusion with respect to the diameter of the shaft 10, the upper protruding portion 26x in FIG. 5B and the upper protruding portion 80x in FIG. 9 are similar to each other, and is 7 to 9% or so.

When the rotor core 16 is pressure bonded, the pressure for applying the same amount of axial force to the rotor core 16 is dispersed more as the area of pressure bonded portions increases. Consequently, the maximum stress acting on the shaft 10 becomes smaller, and the required strength for the shaft 10 can be reduced. Alternatively, when the strength of the shaft 10 is unchanged, the greater axial force can be applied to the rotor 16 as the area of the pressure bonded portions increases. On the other hand, in order to form protruding portions occupying large angles in the circumferential direction, large tool insertion holes need to be provided, resulting in degraded strength of the shaft 10. In addition, when the number of protruding portions is increased in order to increase the area of the pressure bonded portions, the number of tool insertion holes is also increased, resulting in degraded strength of the shaft 10.

In the examples shown in FIGS. 5A, 5B and 9, three protruding portions are arranged to form an equilateral triangle when viewed in the circumferential direction. The tool insertion holes corresponding to the respective protruding portions are also provided at the positions opposite to the protruding portions (positions shifted by 180 degrees in the circumferential direction). By forming the protruding portions in a regular N-polygon (allowing for a margin of error) where N is 3 or more, it becomes possible to fix the rotor core in good balance in the circumferential direction. In addition, by forming a regular N-polygon where N is an odd number, it becomes possible to provide the tool insertion holes at positions opposite the respective protruding portions. Furthermore, by arranging the tool insertion holes at positions opposite the protruding portions, it become possible to keep balance between right and left when the tool is stabbed.

However, the protruding portions can be provided in an arrangement other than a regular N-polygon, so long as they can secure the required strength. Also, even if the positions of the tool insertion holes are shifted from the positions opposite the protruding portions, the protruding portions can be formed with sufficient machining quality. From this viewpoint, there is no need to provide a tool insertion hole for each protruding portion, and one tool insertion hole may be used for forming a plurality of protruding portions. Although, in the example described above, it is assumed that the tool insertion hole is circular, it may have a shape other than a circle. Furthermore, the protruding portions may be formed by inserting the tool from an upper end or a lower end of the shaft without providing the tool insertion holes.

The number of protruding portions, the width of the protruding portions in the circumferential direction, the degree of protrusion in the radial direction, the length of the protruding portions in the axial direction, etc. may be determined such that the force required to pressure bond the rotor core 16 can be secured. Upon designing the rotor, materials of the shaft and the thickness of the wall surface are also to be taken into consideration.

In the above description, it is assumed that the end surfaces on both sides of the rotor core are fixed by the protruding portions formed on the shaft. If both end surfaces are fixed by the protruding portions, no additional component is necessary. There is also no need for complicated processing (the shaft is formed by being subjected to, for example, forging, heat treatment, and machining) for manufacturing the shaft, and the shaft can be easily manufactured from a versatile pipe component. Therefore, an effect of reducing manufacturing cost can be expected. Furthermore, it becomes also possible to quickly change the thickness of the rotor core for multiproduct manufacturing or design change simply by changing the height of the end block shown in FIGS. 2A and 2B and changing positions where the protruding portions are formed. It is also possible to provide the rotor core with necessary axial force when it is fixed by the protruding portions, and therefore, an additional component for providing axial force (axial force is sometimes provided, for example, by providing end plates and using bolts and nuts) is no longer needed.

However, it is also possible to fix both end surfaces of the rotor core by the protruding portions and then further perform processing to fix the rotor core to the shaft by means of a conventional method. It is also possible to fix only one end surface of the rotor core by the protruding portions and fix the other end surface by means of the conventional method. In this case, the protruding portions may be ones provided in advance before the shaft is inserted into the rotor core (the lower protruding portions in the above description) or may be ones provided on the upper side while the rotor core is pressed (the upper protruding portions in the above description). The conventional method includes, for example, aspects of fixing by, for example, press fitting, caulking, and welding by means of a ring as an additional component. In addition, an aspect of welding a rotor and a shaft without an additional component is also included.

REFERENCE SIGNS LIST

10 shaft, 12 lower protruding portion, 14 cut section, 16 rotor core, 18 upper end surface, 20 lower end surface, 22 shaft hole, 24 rotor, 26 upper protruding portion, 28 cut section, 30 lower mold block, 32 shaft base, 34 end block, 36 upper mold block, 40 tool, 42 rod portion, 44 tapered portion, 46 tip end, 50 lower surface, 52 lower surface, 60 wall surface, 62 inner wall surface, 64 outer wall surface, 68 opening, 70 upper tool insertion hole, 72 opening, 74 lower tool insertion hole, 76 additional line, 80 upper protruding portion, 82 cut section, 84 opening.

The invention claimed is:

1. A rotor comprising:
    a rotor core that is formed by laminating steel sheets provided with shaft holes; and
    a shaft that is formed of a hollow metal component and is positioned so as to penetrate through the shaft holes in the steel sheets, wherein
    a wall surface of the shaft is partially cut in the circumferential direction, and of two wall surface regions aligned in the axial direction with a cut portion in between, the wall surface region positioned on the side farther from the rotor core is plastically deformed in the radial direction, thereby forming a protruding portion that opens the cut portion, and
    at least one axial end surface of the rotor core is pressure bonded and fixed to the cut portion of the protruding portion.

2. The rotor according to claim 1, wherein the cut portion of the protruding portion is formed approximately parallel to a pressure bonding part on the end surface.

3. The rotor according to claim 1, wherein both end surfaces of the rotor core are fixed by the cut portions of the protruding portions respectively formed near the end surfaces.

* * * * *